(12) United States Patent
Sano

(10) Patent No.: US 7,967,958 B2
(45) Date of Patent: Jun. 28, 2011

(54) ELECTRODE FOR WATER ELECTROLYSIS

(75) Inventor: Yoichi Sano, Zushi (JP)

(73) Assignee: Ecolab Inc., St. Paul, MN (US)

( * ) Notice: Subject to any disclaimer, the term of this patent is extended or adjusted under 35 U.S.C. 154(b) by 1410 days.

(21) Appl. No.: 11/438,552

(22) Filed: May 22, 2006

(65) Prior Publication Data

US 2006/0260931 A1 Nov. 23, 2006

(51) Int. Cl.
*B01D 69/00* (2006.01)
*B01D 61/00* (2006.01)

(52) U.S. Cl. ............... 204/193; 204/242; 204/639

(58) Field of Classification Search ............... 204/242, 204/284, 638, 639, 193
See application file for complete search history.

(56) References Cited

U.S. PATENT DOCUMENTS

| | | | |
|---|---|---|---|
| 3,616,355 A | 10/1971 | Themy et al. | |
| 3,975,246 A | 8/1976 | Eibl et al. | |
| 5,589,052 A | 12/1996 | Shimamune et al. | |
| 5,674,365 A | 10/1997 | Sano | |
| 5,858,201 A | 1/1999 | Otsuka et al. | |
| 5,897,757 A * | 4/1999 | Sano | 204/284 |
| 5,965,009 A | 10/1999 | Shimamune et al. | |
| 6,096,177 A | 8/2000 | Kamitami et al. | |
| 6,126,796 A | 10/2000 | Shimamune et al. | |
| 6,140,428 A * | 10/2000 | Seeliger et al. | 525/418 |
| 6,143,163 A | 11/2000 | Sawamoto et al. | |
| 6,187,154 B1 | 2/2001 | Yamaguchi et al. | |
| 6,235,186 B1 | 5/2001 | Tanaka | |
| 6,464,845 B2 | 10/2002 | Shirota et al. | |
| 6,524,450 B1 | 2/2003 | Hara | |
| 6,585,867 B1 | 7/2003 | Asano | |
| 6,905,580 B2 | 6/2005 | Kurokawa et al. | |
| 7,090,753 B2 | 8/2006 | Sumita | |
| 7,238,272 B2 | 7/2007 | Sano | |
| 2004/0020787 A1 | 2/2004 | Sano | |
| 2004/0055896 A1 | 3/2004 | Anderson et al. | |
| 2004/0060815 A1 | 4/2004 | Buckley et al. | |

FOREIGN PATENT DOCUMENTS

| | | |
|---|---|---|
| EP | 0 103 636 A | 5/2001 |
| JP | 11100688 A2 | 4/1999 |
| JP | 2001-286868 | 10/2001 |

* cited by examiner

*Primary Examiner* — Harry D Wilkins, III
*Assistant Examiner* — Zulmariam Mendez
(74) *Attorney, Agent, or Firm* — Andrew D. Sorensen; Shaoni L. Mitchell

(57) ABSTRACT

In an apparatus for producing acidic electrolyzed water, the use of a protection membrane having slits or other discontinuities allows the protection of a permeable membrane, such as an anion-permeable or anion-selective membrane, from chlorine generated by the electrolysis. The protection membrane further preserves the electrical conductivity of the membrane and electrode assembly, because of a venting action of trapped gas and fluid through the slits. The protection membrane is useful both in three chambered electrolyzers and in two chambered electrolyzers. The preferred protection membrane has slits formed by overlapping strips of fabric or the like. The preferred fabric is a non-woven fabric.

19 Claims, 4 Drawing Sheets

Figure 1
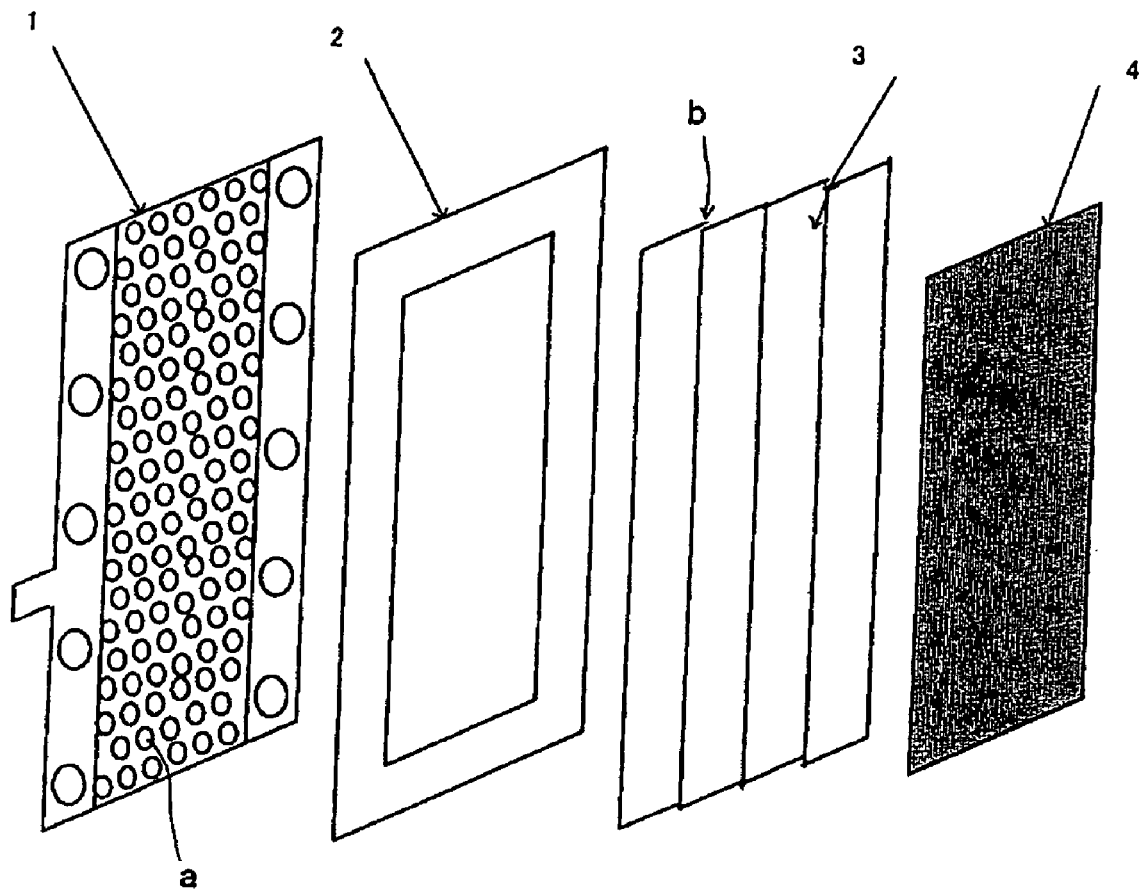
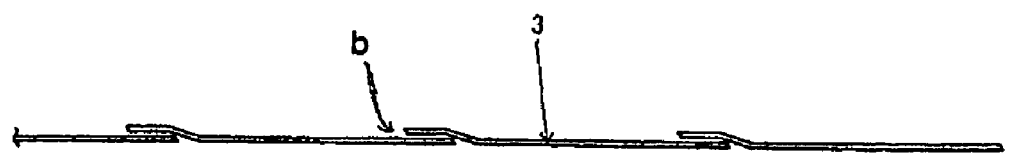
Figure 2

Figure 5
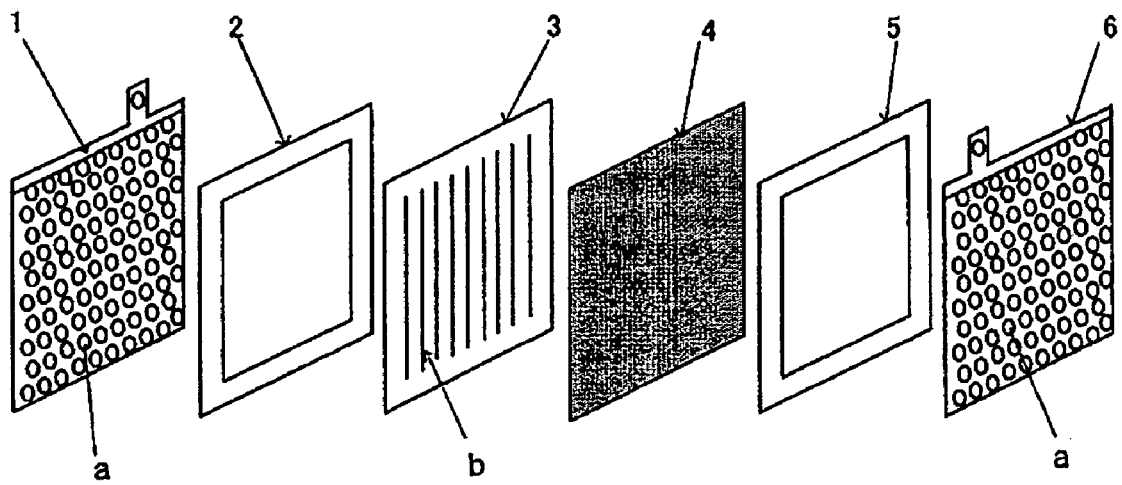
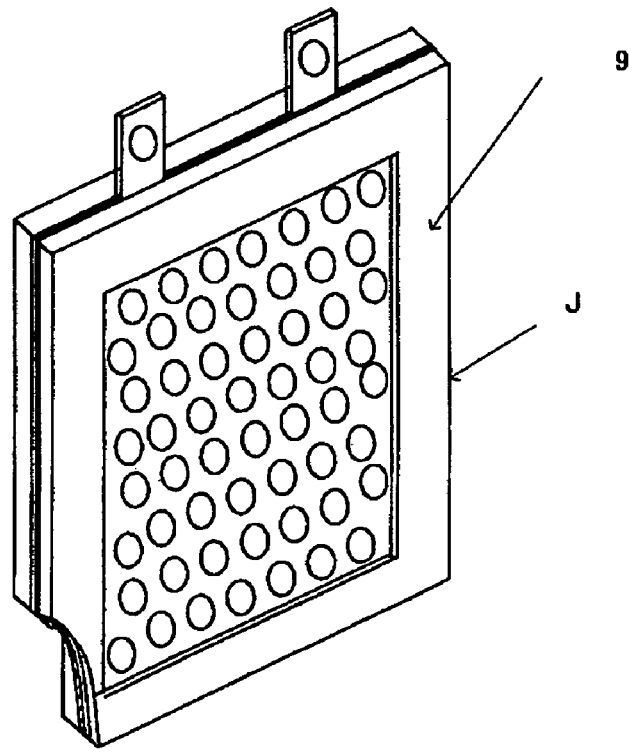
Figure 6

ELECTRODE FOR WATER ELECTROLYSIS

This application is a continuation in part of Japanese application 2005-147,482, filed May 20 2005, and of Japanese application 2005-175,654, each of which is incorporated by reference in its entirety.

FIELD OF THE INVENTION

This invention relates to an electrode used in water electrolysis equipment for electrolyzing water that includes chloride ions for the production of acidic electrolyzed water with high-strength sterilization capability. The lifetime of the electrode is improved by providing a protection membrane for a ion permeable membrane, preferably provided with slits to bent gas.

BACKGROUND

It is known to electrolyze tap water that has been provided with chloride ions, and thereby to generate acidic electrolyzed water at the positive electrode (anode). In general, acidic electrolyzed water contains available chlorine in equilibrium with a hypochlorous acid constituent. This acidic electrolyzed water has a strong sterilization effect on various types of microbes such as e-coli and other bacteria, and has recently begun to see increased use in medicine, agriculture, dairy industries, etc. The constituents that provide the sterilization effect in acidic electrolyzed water are chlorine gas, hypochlorous acid, and hypochlorite. Of these the sterilization strength of hypochlorous acid is highest. An additional advantage is that the acidic electrolyzed water can maintain the sterilization effect through long periods of storage.

Broadly speaking, the following two methods are described for electrolyzing water to produce acidic electrolyzed water that contains available chlorine and has strong sterilization capability:

(1) a method of generating acidic electrolyzed water that contains available active chlorine in the positive electrode chamber, by flowing tap water, into which a small amount of electrolyte containing chloride ions has been added, through both chambers of a two-chamber electrolysis apparatus which has a positive electrode chamber and a negative electrode chamber, separated by a permeable membrane to perform the electrolysis; and (2) a method of generating acidic electrolyzed water by placing a liquid containing chloride ions in the center chamber of a three-chamber electrolysis apparatus, which is made up of a positive electrode chamber, a negative electrode chamber and a center chamber where, by passing tap water through both the positive electrode chamber and the negative electrode chamber, and applying a DC voltage to the positive electrode and negative electrode, the chloride ions in a chloride-containing electrolyte in the center chamber are caused to migrate to the positive electrode chamber, through the principle of electro-dialysis, generating acidic electrolyzed water that includes available active chlorine by the electrolysis reaction in the positive electrode chamber. Other methods are known, including an improved method described in JP 2005-175,654.

The electrolytic reactions that occur on the surface of or near the positive electrode surface include both a desired reaction that generates chlorine gas from chloride ions, and the competing reaction of water that generates hydrogen ions and oxygen gas. Suppression of the reaction of water is important for increasing the production rate of chlorine gas needed to enhance the generation efficiency of available chlorine. Methods for performing this suppression of oxygen generation include (1) placing the positive electrode plate and permeable membrane in close proximity to one another and generating effective electrolysis prior to the transmission of the chloride ion through the permeable membrane and its dispersal in a large amount of water; and (2) restricting the amount of tap water for electrolysis passed through the positive electrode chamber with respect to the current applied, in order to increase the concentration of chloride ions in the positive electrode chamber and to increase the probability of the chlorine reacting. (These reactions are described in JP 3,113,645).

In either of these methods the electrodes and the permeable membrane are placed as close together as possible to enhance the production efficiency of acidic electrolyzed water. However, with the permeable membrane and electrodes placed in close proximity in this manner, especially in the case where an ion exchange membrane is used as the permeable membrane, the ion exchange membrane and its supporting material deteriorate and break down more easily due to chlorination by chlorine gas generated at the electrode.

SUMMARY OF THE INVENTION

The present invention was generated in consideration of the above, to overcome this difficulty. The invention uses a negative ion permeable membrane, preferably a negative ion exchange membrane, as the permeable membrane, and generates chlorine gas in the positive electrode chamber of an electrolysis apparatus, where the positive electrode and the permeable membrane are placed in close proximity to one another, thereby providing an improved method of producing acidic electrolyzed water containing available chlorine. The improvement is in providing a water electrolysis electrode that solves the difficulty of maintaining stable production, said difficulty being caused by deterioration of the negative ion exchange membrane from the chlorine gas generated on the positive electrode surface.

BRIEF DESCRIPTION OF THE DRAWINGS

FIG. 1: Assembly drawing of an example of an electrode used for water electrolysis of the present invention.

FIG. 2: Cross sectional drawing of an example of a protection membrane used in the present invention.

FIG. 5: Assembly drawing of another example of an electrode used for water electrolysis of the present invention.

FIG. 6: Perspective drawing of an example of an electrode used for water electrolysis of the present invention.

Figure 3:
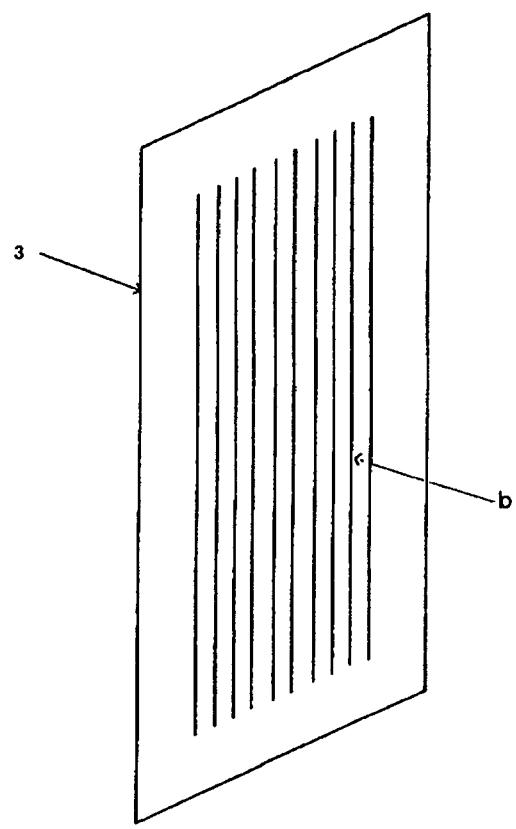
FIG. 3: A perspective drawing of another protection membrane used in the present invention.

DETAILED DESCRIPTION OF THE INVENTION
(METHODS FOR SOLVING THE PROBLEM)

Various methods were investigated for preventing deterioration and damage over time, due to chlorine gas, of the permeable membrane in the form of a negative ion exchange membrane. As a measure for preventing deterioration of the permeable membrane, the placing of a protection membrane between the permeable membrane and the positive electrode to prevent contact of the chlorine ions with the permeable membrane was considered. However, implementation of this two-layer type permeable membrane and protection membrane made continuation of electrolysis difficult. As a result of investigation, the cause was found to be the transfer or so-called infusion of ions accompanying the electrolysis reaction; when the ions accompanied by liquid and gas are transmitted through the permeable membrane, the gas and water are caught between the two layers of the membrane, i.e., between the protection membrane and the anion exchange membrane. It was learned that the gas and water that are caught between the two membranes exhibit very high electrical resistance and make it difficult to continue with electrolysis. After much investigation, a plurality of slit-shaped discontinuities and the like were formed in the protection membrane as an outlet for the liquid and gas. Thus, instead of being caught between the two membranes, gas and water are discharged through the slit-shaped discontinuities. This prevents an increase in electrical resistance, while also preventing direct contact of chlorine gas with the ion exchange membrane to avoid deterioration of the membrane.

The present invention is an electrode for water electrolysis used in water electrolysis equipment to produce acidic electrolyzed water containing available chlorine. This electrode is characterized by having a positive electrode (anode) plate that preferably has a plurality of holes, in combination with a protection membrane; and further by a protection membrane that has a plurality of slit-shaped discontinuities. In the preferred embodiments, the electrode is adjacent to a permeable membrane that is a negative ion (anion) exchange membrane, placed next to the protection membrane on the side facing the negative electrode. A negative electrode with a plurality of holes can be placed on the permeable membrane side of the water electrolysis electrode described above. Overlap construction of the slit-shaped discontinuities of the protection membrane described above is desirable.

In one embodiment, the electrode for water electrolysis of the present invention uses a negative ion (i.e., anion) permeable ion exchange membrane as the permeable membrane. This electrode, that produces acidic electrolyzed water containing available chlorine, such as hypochlorous acid, by generation of chlorine gas in an electrolysis apparatus and the ensuing reaction of chlorine gas and water, has the effect that when the positive electrode and permeable membrane of the electrode for water electrolysis are placed in close proximity to one another, acidic electrolyzed water is produced efficiently.

Furthermore, using the water electrolysis electrode of the present invention, although the electrode and permeable membrane are placed in close proximity to one another, a protection membrane is placed between the electrode and the permeable membrane. This protection membrane prevents direct contact of chlorine gas with the ion exchange membrane, preventing deterioration of the negative ion exchange membrane due to chlorine gas and enabling high efficient operation over a long period of time. In addition, this electrode is equipped with slit-shaped discontinuities, wherein during electrolysis the slit-shaped discontinuities discharge any chlorine gas generated at the positive electrode surface and water, before the chlorine gas is caught between the two membranes, thereby preventing an increase in electrical resistance.

PREFERRED EMBODIMENTS OF THE INVENTION

One example of the electrode for water electrolysis of the present invention is described in the Figures. FIG. 1 is an assembly drawing of an electrode for water electrolysis of the present invention. The symbol 1 is for a positive electrode plate, 2 is for an insulator, 3 is for a protection membrane, and 4 is for a permeable membrane that is a negative ion exchange membrane. The protection membrane 3 is overlaid onto the positive electrode plate 1. Insulation 2 is inserted as necessary. Next, the permeable membrane 4 that is a negative ion exchange membrane is overlaid onto the protection membrane 3. It is desirable to integrate the positive electrode plate 1, the insulation 2 used as necessary, the protection membrane 3, and the permeable membrane 4 that is a negative ion exchange membrane, which are overlaid together. The electrode for water electrolysis with this structure is used as the positive electrode.

Preferably, as described in U.S. Pat. No. 5,674,365, holes "a" are formed in the positive electrode 1. The shape of the holes "a" is arbitrary. However, a circular shape is desirable. With the circular shape, a diameter of 1 to 5 mm is desirable. Titanium, gold, platinum, iron oxide, and graphite etc., can be used as the material for the positive electrode plate; however, use of titanium as a base material with a platinum-family coating is desirable. It is especially desirable to use platinum-family materials such as iridium oxide, palladium, or ruthenium as a catalyst for increasing the generation efficiency of the available chlorine. A suitable thickness for the metal used is 0.1 to 5 millimeters. Next, the insulator 2 is formed out of a non-electrical conducting material such as, for example, synthetic resin. The insulator 2 is used as needed.

The protection membrane 3 is made from a non-electrically conductive material that has a plurality of slit-shaped discontinuities b inserted in the surface. FIG. 2 is a cross-sectional diagram of the protection membrane 3 from FIG. 1 above. This protection membrane, as shown in FIG. 2 uses a plurality of pieces of non-woven fabric cut into strips. A strip of non-woven fabric is overlapped on the edge of another strip of non-woven fabric; another strip of non-woven fabric is overlapped onto the second strip of non-woven fabric and so on, repeating in this fashion. These strips are integrated into one piece. The integration can be performed for example by bonding the outside edges using an adhesive. A slit-shaped discontinuity is formed in the overlapped sections. The amount of overlap differs with the size of the protection membrane; however, one to five millimeters of overlap is desirable. The protection membrane of this shape is suitable primarily when the protection membrane surface is large. This maintains the openings in the slit-shaped discontinuities of the overlap portion when a non-uniform load is exerted on the protection membrane, causing distortion and when a pressure is exerted that causes swelling.

FIG. 3 is a perspective drawing of another example of a protection membrane of the present invention. This protection membrane is an example which retains the outer edges of the non-woven fabric permeable membrane and introduces a plurality of slit-shaped discontinuities (slits) "b". A width of 1 to 10 mm for these slits "b" is desirable and of 3 to 7 mm is even further desirable. This simplifies manufacture of the protection membrane; however, due to distortion caused by a non-uniform load or swelling caused by pressure, there is the possibility that chlorine gas can contact the ion exchange membrane directly through slight opening of the slits. It follows that this procedure is suitable for small electrodes where the change in shape of the membrane is minimal.

The direction of the slit-shaped discontinuities of the protection membrane 3 can be up and down, side to side, or diagonal etc. In addition, a plurality of fine holes can also be formed. The spacing interval of the slit-shaped discontinuities is arbitrary; however, too narrow an interval increases the chances of the opening of the slit-shaped discontinuities allowing chlorine gas to contact the ion exchange membrane. On the other hand, if there are too few intervals, discharge of gas and liquid is insufficient and can lead to an increase in electrolytic voltage. In general, a spacing interval of one to seven millimeters is desirable. This protection membrane 3 prevents the chlorine gas generated on the surface of the positive electrode from contacting the ion exchange membrane. When a liquid or gas is caught between the protection membrane and the ion exchange membrane, the protection membrane functions by slightly changing shape and discharging this liquid or gas. Examples of suitable materials for the protection membrane 3 include, without limitation, asbestos, glass wool, polyvinyl chloride fibers, polyvinylidene chloride fibers, polyester fibers, aromatic polyamide fibers or non-woven fabric made from any of these fibers, paper, or cellophane paper can be used as the material for this protection membrane 3. A non-woven fabric that provides favorable ion exchange is desirable.

Figure 4:
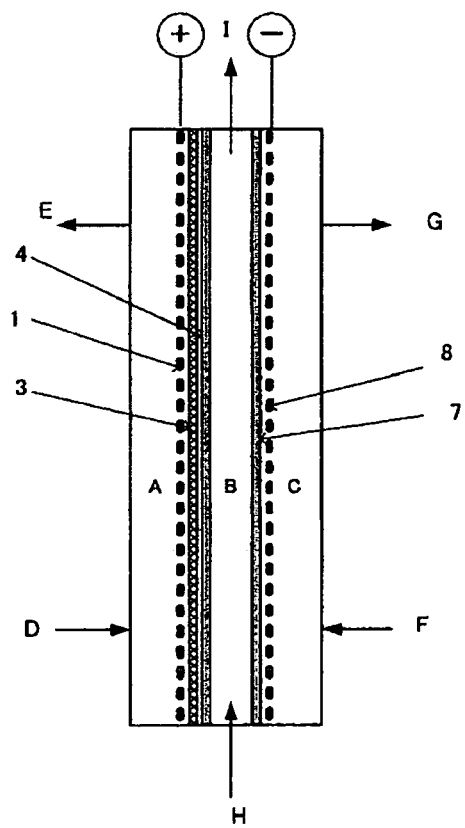
FIG. 4: Perspective drawing that shows a usage example of an electrode used for water electrolysis of the present invention.

FIG. 4 is a cross-sectional drawing of a three chamber electrolysis bath for which the electrode shown in FIG. 1 is used as the positive electrode. The electrolysis bath is made up of three chambers separated with an electrode and a permeable membrane. The symbol A is for the positive electrode chamber, B for the center chamber, and C is the negative electrode chamber. The positive electrode chamber A and center chamber B are separated by the positive electrode. This positive electrode is the positive electrode plate 1 with a plurality of holes, the protection membrane 3 that has slits and the permeable membrane 4 that is a negative ion exchange membrane are shown in FIG. 1 overlaid together. Furthermore, the center chamber B and negative electrode chamber C are separated by the negative electrode. The negative electrode is the permeable membrane 7 overlaid together with a negative electrode plate 8 with a plurality of holes. Electrolyte containing chloride ions is placed in the center chamber B, tap water flows through the positive electrode chamber A and the negative electrode chamber C, performing the electrolysis. The symbol D is for the inlet introducing tap water to the positive electrode chamber. The symbol E is for the outlet where the acidic electrolyzed water is discharged. The symbol F is for the inlet introducing tap water to the negative electrode chamber. The symbol G is for the outlet where the alkaline electrolyzed water is discharged. The symbol H is for the inlet used for the electrolytic water and the symbol I is the outlet for the electrolytic water. The electrolyte placed in the center chamber B is generally sodium chloride; however, other salts that contain chloride ion such as potassium chloride are suitable. Furthermore, another halogen ion can be used, in whole or in part, in place of the chloride ion.

FIG. 5 is an assembly drawing of an example of a water electrolysis electrode where a negative electrode plate with a plurality of holes is overlaid onto the electrode (positive electrode) for water electrolysis described above on the permeable membrane side. The symbol 1 is for the positive electrode plate, 2 the insulator, 3 the protection membrane, and 4 for the permeable membrane, the same as noted previously. In addition, 5 is another insulator and is the same structure as the insulator 2. The symbol 6 is for the negative electrode plate. The negative electrode plate 6 has a plurality of holes of the same form as with the positive electrode plate 1. The shape of the holes "a" is arbitrary; however, a circular shape is desirable. With a circular shape, a diameter of 1 to 5 mm is desirable. In addition, the material used for the negative electrode 6 can be the same as the material used for the positive electrode plate 1; however, as the solution is alkaline, materials that corrode easily in acid such as steel, stainless steel, tin, or copper can only be used for a short time.

FIG. 6 is a perspective drawing of the electrode shown in FIG. 5 with the positive electrode 1, insulator 2, protection membrane 3, permeable membrane 4, insulator 5, and negative electrode 6 overlaid and placed in this order, integrated with a frame 9 on each side for holding in place around the edges. For integration of the electrode, use of adhesive near the frame on each of the parts and for integrating with the fixation frame 9 is preferable. Here, a non-electrically conducting adhesive must be used to maintain insulation and prevent direct contact between the positive electrode plate and the negative electrode plate. The material used for the fixation frame 9 is a non-electrically conducting material that is a plastic such as polyvinyl electrode, polyethylene, or polypropylene or ceramic or glass.

Embodiment 1

In this embodiment, an electrode prepared as the positive electrode plate of the present invention is used with a three chamber electrolyzer apparatus for electrolysis of water. The electrode, shown in FIG. 1, is made up of a positive electrode plate 1, protection membrane 3, and permeable membrane 4 (negative ion exchange membrane) is formed to a size of 9 cm wide and 15 cm tall and used as the positive electrode for the three chamber electrolyzer apparatus shown in FIG. 4. In other words, this positive electrode was used to separate the positive electrode chamber A from the center chamber B. Furthermore, a negative electrode made up of a negative electrode plate 8 and permeable membrane 7 (fluorine based positive ion exchange membrane) was placed to separate the center chamber B and negative electrode chamber C. A saturated sodium chloride aqueous solution was placed in the center chamber B. Electrolysis was performed using a load current of 6.5 amps.

A comparison of electrolysis using various forms of protection membrane is shown in Table 1, where the pH and the concentration of available chlorine was measured, and the operating conditions were monitored. The results are shown in Table 1. The screen butterfly net shown in Table 1 is one that is commercially available. A micro filter MF250B manufactured by Yuasa M&B was used as the non-woven fabric. The slit-shaped discontinuities based on overlapping were formed through overlapping strips of non-woven fabric 15 mm wide. In addition, the slit discontinuities were formed by slits with an interval width of 5 mm. In Table 1, the Xs indicate the increase in voltage shortly after start of operation where continued operation was not feasible and the Os indicate tests where continued operation was possible. Aciplex A501 (manufactured by Asahi Kasei) was used as the permeable membrane that is a negative ion exchange membrane.

TABLE I

| Type of protection membrane | Voltage | pH | Available chlorine (ppm) | Operation |
|---|---|---|---|---|
| No protection membrane | 6 | 2.7 | 50 | ○ |
| Butterfly net screen | | | | X |
| Non-woven fabric (no slit shape discontinuities) | — | 3.2 | 30 | X |
| Non-woven fabric (overlap) | 7 | 3.2 | 40 | ○ |

TABLE I-continued

| Type of protection membrane | Voltage | pH | Available chlorine (ppm) | Operation |
|---|---|---|---|---|
| slit shaped discontinuities used) Non-woven fabric (slits used as slit shaped discontinuities) | 6 | 2.8 | 50 | ○ |

Referring to Table 1, for the case of using butterfly net screen as the protection membrane, the voltage rose slightly after start of operation, and the operation was no longer feasible. In addition, when non-woven fabric without slit-shaped discontinuities was used, operation was feasible for approximately 30 minutes, and acidic water was obtained; however, at this point, the voltage rose dramatically, and operation was no longer feasible. Moreover, when operating without a protection sheet, or operating with a non-woven sheet with slit-shaped discontinuities, continuation of the operation was feasible. However, in the case of operation without a protection sheet, after 1000 hours the negative ion exchange membrane became whitish and deteriorated. On the other hand, in the case where a non-woven fabric with slit-shaped discontinuities was used, there was virtually no change in the negative ion exchange membrane after 1000 hours of operation.

Embodiment 2

Figure 7:
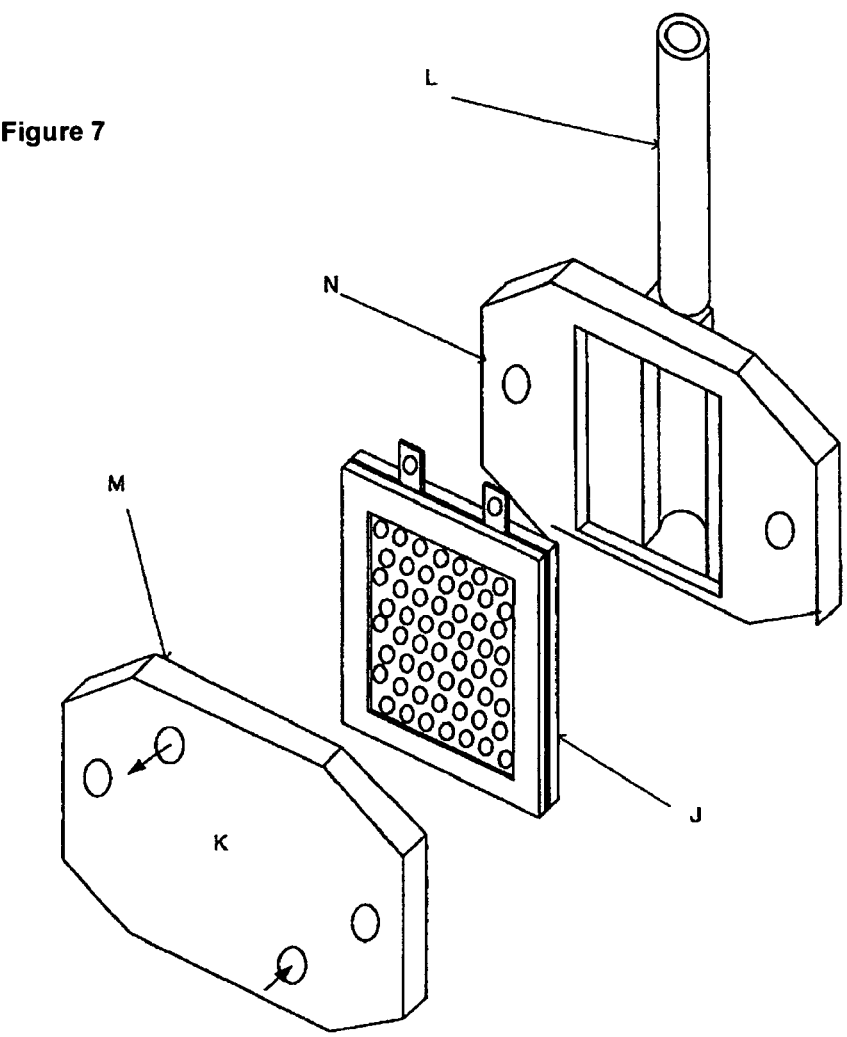
FIG. 7: Perspective drawing that shows a usage example of an electrode used for water electrolysis of the present invention.
Figure 8:
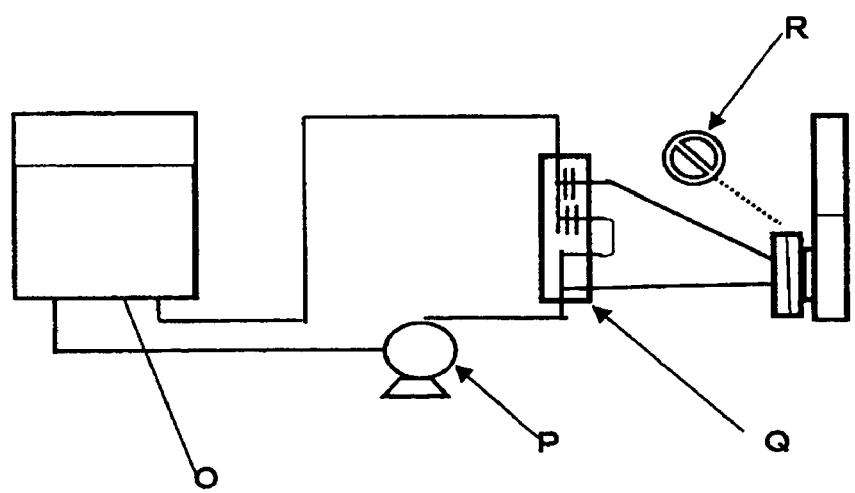
FIG. 8: Perspective drawing that shows a usage example of an electrode used for water electrolysis of the present invention.

This embodiment is equipped with a positive electrode and a negative electrode of the present invention. In other words, the electrode described previously for FIG. 6 is used, and electrolysis is performed using the electrolysis equipment shown in FIG. 7 and FIG. 8. (This equipment is a two-chambered apparatus with a non-circulating cathode compartment, and is described in more detail in co-pending application JP 2005-175654). The protection membrane of the electrode j structure of FIG. 6 used for this embodiment is ten pieces of non-woven fabric (micron filter MF250B) with 5 mm slit intervals as the protection membrane, has an effective surface area of approximately 20 cm², and is mounted using an approximately 6 cm square frame. FIG. 7 is an assembly drawing of the electrolytic equipment with a positive electrode chamber K and an electrolysis apparatus L in which the integrated electrode plate is mounted. Flanges M and N are joined to form a positive electrode bath and a negative electrode bath, and to assemble the electrolysis apparatus. Note that packing or gasketing was used to fix the electrode J against the flanges. FIG. 8 shows the flow of tap water when the electrolysis equipment of FIG. 7 is used to electrolyze water. The symbol Q is the tap water storage tank, P the pump, Q the tap water distribution device, R the timer that controls the time electrolysis is performed.

Five liters of tap water stored in the tap water storage tank O were circulated through the positive electrode chamber by the pump P, and product water with a concentration of 30 ppm of available chlorine was produced. Here, the amount of tap water actually flowing through the positive electrode chamber K was maintained at or below 40 cc per minute per ampere, and the rest was returned to the storage tank using the bypass; this distribution was performed by the liquid distribution device Q. The generation efficiency of available chlorine concentration is favorable, and it was possible to hold the operating voltage down. The DC power supply voltage supplied for this embodiment was 5 Volts and current was 6 Amps. Furthermore, the amount of time needed to produce acidic electrolyzed water with 30 ppm available chlorine was 5.5 minutes.

CONCLUSION

In an apparatus for producing acidic electrolyzed water, the use of a protection membrane having slits allows the protection of a permeable membrane from chlorine generated by the electrolysis, together with a venting action of trapped gas and fluid through the slits which preserves the electrical conductivity of the membrane and electrode assembly. The protection membrane is useful both in three chambered electrolyzers and in two chambered electrolyzers. The preferred protection membrane has slits formed by overlapping strips of fabric or the like. The preferred fabric is a non-woven fabric.

The nature of the invention has been illustrated by description and examples to aid in its understanding. The scope of the invention is not confined by these illustrations, but rather by the scope of the claims.

The invention claimed is:

1. An improved electrode assembly for the production of acidic electrolyzed water, wherein an anodic section of the assembly comprises a protection membrane provided with slit-shaped discontinuities, placed between a positive electrode, and an anion-permeable membrane, the protection membrane functioning to protect the anion permeable membrane from chlorine generated at the positive electrode by allowing gas to escape from the space between the protection membrane and the anion permeable membrane.

2. The electrode assembly of claim 1 wherein the protection membrane comprises a non-woven fabric.

3. The electrode assembly of claim 1 wherein the slit-shaped discontinuities comprise a plurality of overlapped non-woven fabric strips.

4. The electrode assembly of claim 3 wherein the overlap between non-woven fabric strips is about one to about five millimeters.

5. The electrode assembly of claim 1 wherein the anion-permeable membrane is an anion-selective membrane.

6. The electrode assembly of claim 1 wherein the assembly further comprises a first insulator between the protection membrane and the positive electrode.

7. The electrode assembly of claim 1 wherein the electrode assembly further comprises a cathodic section.

8. The cathodic section of claim 7 comprising a second insulator and a negative electrode.

9. The electrode assembly of claim 1 further comprising fixation frames.

10. The electrode assembly of claim 9 wherein the positive electrode, first insulator, protection membrane, anion-permeable membrane, second insulator, and negative electrode are bonded together between fixation frames to form a unitary electrode.

11. A three chamber electrolysis bath comprising of the electrode assembly of claim 1, wherein the three chamber electrolysis bath further comprises a center chamber between an anode chamber containing a positive electrode and a cathode chamber containing a negative electrode, wherein the central chamber is bounded by an anion permeable membrane between the central chamber and the anode chamber, and wherein the central chamber is further bounded by a permeable membrane and a negative electrode between the central chamber and the cathode chamber.

12. An improved electrode assembly for producing acidic electrolyzed water, the assembly comprising:

an anodic chamber comprising a protection membrane provided with slit-shaped discontinuities for venting gas and liquid, placed between a positive electrode, and an anion-permeable membrane;

a cathodic chamber containing a negative electrode;

a central chamber placed between the anionic chamber and the cathodic chamber, wherein the central chamber is separated from the anodic chamber by the anion-permeable membrane and the central chamber is separated from the cathodic chamber by a permeable membrane;

a first insulator placed between the positive electrode and the protection membrane;

a second insulator placed between the anion-permeable membrane and the negative electrode; and wherein the protection membrane protects the anion permeable membrane from gas produced by the positive electrode.

13. The electrode assembly of claim 12 wherein the protection membrane comprises a non-woven fabric.

14. The electrode assembly of claim 12 wherein the slit-shaped discontinuities comprise a plurality of overlapped non-woven fabric strips.

15. The electrode assembly of claim 12 wherein the overlap between non-woven fabric strips is about one to about five millimeters.

16. The electrode assembly of claim 12 wherein the anion-permeable membrane is an anion-selective membrane.

17. The electrode assembly of claim 12 wherein the positive electrode, the first insulator, the protection membrane, the anion exchange membrane, the second insulator, and the negative electrode are bonded together between fixation frames to form a unitary electrode.

18. The electrode assembly of claim 12 wherein the electrode assembly is interposed and enclosed between a first and a second flange, wherein the first flange comprises a negative electrode chamber and an electrolyte-containing bath, and the second flange comprises a positive electrode chamber.

19. The electrode assembly of claim 12 wherein water for electrolysis is circulated from a tank by a pump, or is obtained from a continuous source, and at least a portion of the water for electrolysis passes through the positive electrode chamber.

* * * * *